(12) United States Patent
Yanagi et al.

(10) Patent No.: US 6,480,267 B2
(45) Date of Patent: Nov. 12, 2002

(54) WAVEFRONT SENSOR, AND LENS METER AND ACTIVE OPTICAL REFLECTING TELESCOPE USING THE SAME

(75) Inventors: Eiichi Yanagi; Makoto Fujino, both of Tokyo (JP)

(73) Assignee: Kabushiki Kaisha TOPCON, Tokyo (JP)

( * ) Notice: Subject to any disclaimer, the term of this patent is extended or adjusted under 35 U.S.C. 154(b) by 0 days.

(21) Appl. No.: 09/748,894

(22) Filed: Dec. 26, 2000

(65) Prior Publication Data

US 2001/0006210 A1 Jul. 5, 2001

(30) Foreign Application Priority Data

Dec. 28, 1999 (JP) .......................................... 11-375223

(51) Int. Cl.[7] .................................................. G01J 1/00
(52) U.S. Cl. ........................ 356/121; 356/123; 356/125; 356/124
(58) Field of Search ................................ 356/121, 122, 356/123, 124, 125; 250/201.9; 359/849, 838, 846; 351/221

(56) References Cited

U.S. PATENT DOCUMENTS

| | | | | |
|---|---|---|---|---|
| 4,902,115 A | * | 2/1990 | Takahashi | 359/849 |
| 5,130,852 A | * | 7/1992 | Hamanka | 359/741 |
| 5,233,174 A | * | 8/1993 | Zmek | 356/121 |
| 5,493,391 A | * | 2/1996 | Neal et al. | 356/121 |
| 5,610,707 A | * | 3/1997 | Duncan et al. | 356/121 |
| 6,042,233 A | * | 3/2000 | Mihashi et al. | 351/221 |
| 6,184,974 B1 | * | 2/2001 | Neal et al. | 356/121 |

FOREIGN PATENT DOCUMENTS

JP  02 238 338  * 9/1990

* cited by examiner

Primary Examiner—Frank G. Font
Assistant Examiner—Sang H. Nguyen
(74) Attorney, Agent, or Firm—Chapman and Cutler

(57) ABSTRACT

A wavefront sensor includes a plurality of lenses disposed in the same plane, and an area sensor that receives a bundle of rays of light collected through each of the lenses as a luminous point. Each of the lenses comprises a plurality of concentric areas with different focal lengths, and the area sensor is located substantially halfway between a first position in which a plane wave forms an image after passing through one of the concentric areas with a minimum focal length, and a second position in which the plane wave fronts an image after passing through another area with a medium focal length. With the wavefront sensor thus arranged, the measurement can be always achieved with high accuracy without involving noticeable blurring of luminous points on the area sensor regardless of the wavefront shape of a light beam indent to the lenses.

30 Claims, 8 Drawing Sheets

WAVEFRONT SENSOR, AND LENS METER AND ACTIVE OPTICAL REFLECTING TELESCOPE USING THE SAME

BACKGROUND OF THE INVENTION

1. Field of the Invention

The present invention relates to a wavefront sensor fir measuring wavefront shape of a light beam, and a lens meter and an active optical reflecting telescope using the wavefront sensor.

2. Description of Related Art

Conventionally, a Hartmann wavefront sensor is known as a wavefront sensor for measuring wavefront shape of a light beam. The Hartmann wavefront sensor includes a plate member called the Hartmann plate having multiple small openings regularly formed therein at a constant interval, and an area sensor disposed parallel to the Hartmann plate. A light beam is radiated onto the Hartmann plate from the opposite side of the area sensor. The incident light beam forms a thin pencil or bundle of rays of light as it passes through the openings and creates multiple luminous points on the area sensor according to the number of openings.

When the incident light beam is a plane wave, the interval between the openings in the Hartmann plate and the interval between the luminous points on the area sensor are equal. Even when the interval of the openings and the interval of the luminous points are not equal, the direction of light of the transmitted rays can be calculated from the position of the luminous points on the area sensor, because the distance between the Hartmann plate and the area sensor, and the position of the openings in the Hartmann plate are known Because this direction is equal to a direction normal to the wave plane of incident light beam, wavefront shape of the incident light beam can be measured based on multiple directions of the light.

On the other hand, m order to improve the S/N ratio, each opening of the Hartmann plate is usually equipped with a single focus lens of the same specification, and the area sensor is disposed on the local point of each lens The conventional wavefront sensor has a problem however that when the incident light beam is a plane wave, the S/N ratio can be sufficiently improved by using a single focus lens and an area sensor located at the focal point of the single focus lens, however, if the incident light beam is not a plane wave, the luminous point on the area sensor becomes blurred and the S/N ratio decreases significantly.

Figures 12A, 12B, 12C:
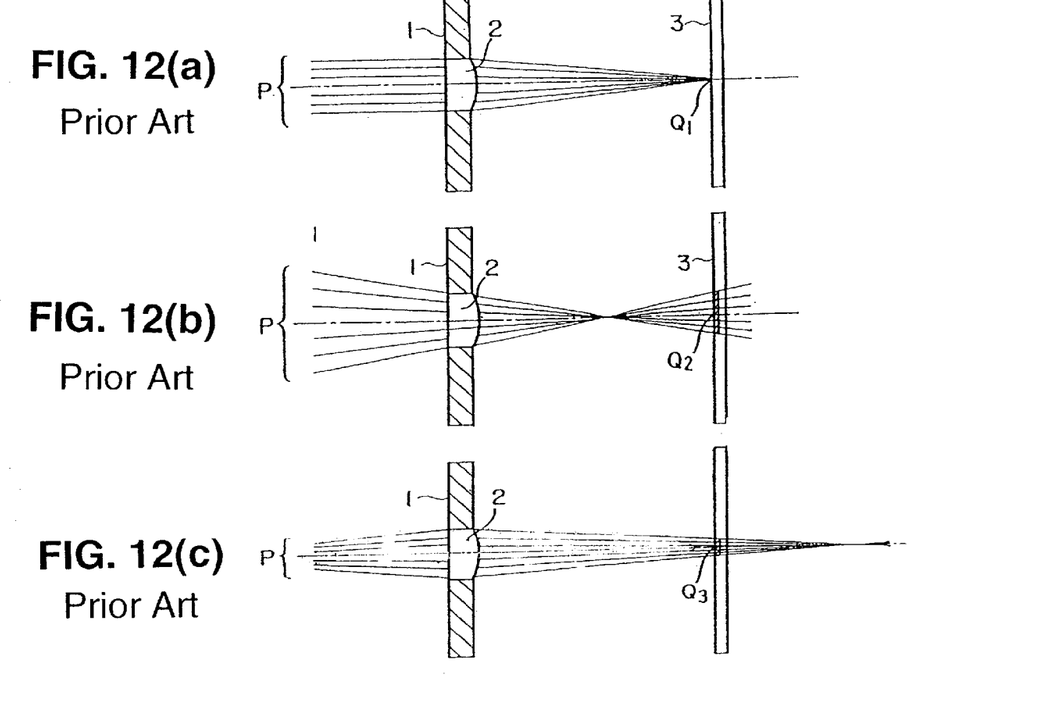
FIG. 12(a) is a view illustrative of the manner in which an image is formed when a parallel light beam is incident on a conventional wavefront sensor.
FIG. 12(b) is a view illustrative of the manner in which an image is formed when a convergence light beam is incident on the conventional wavefront sensor.
FIG. 12(c) is a view illustrative of the manner in which an image is formed when a divergent light beam is incident on the conventional wavefront sensor.
Figure 13:
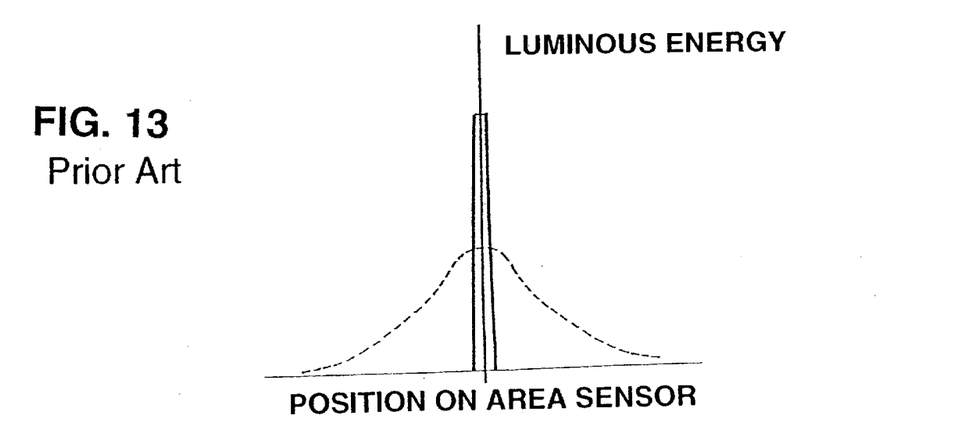
FIG. 13 is a graph showing luminous energy distributions on an area sensor of the wavefront sensor shown in FIGS. 12(a)–12(c).

As shown in FIG. 12(a), when a light beam P incident to a lens 2 on the Hartmann plate 1 is a plane wave, light through the lens 2 is collected at one point on an area sensor 3 and creates a luminous point Q1. The luminous point Q1 has a luminous energy distribution indicated by the solid line shown in FIG. 13. However, as shown in FIGS. 12(b) and 12(c), when the incident light beam P is either divergent light or convergent light, light transmitted through the lens 2 does not converge on the area sensor 3 and creates a rather large-size luminous point Q2 or Q3 on the area sensor 3. These luminous points Q2 and Q3 have a luminous energy distribution indicated by the broken line shown in FIG. 13 and thus they are significantly blurred due to the absence of a clear luminous energy difference from the surroundings as demonstrated by the luminous point Q1. Therefore, when the luminous energy received by the area sensor 3 decreases due to the presence of dust or scars on the lenses, it easily affects the luminous points Q2 and Q3, and in the worst case, these points cannot be recognized as a luminous point.

In addition, since the periphery of the blurred luminous point is unclear and extends outwardly far from the center of the luminous point, the adjacent luminous points on the area sensor 3 may touch or overlap each other. To avoid this, it is necessary either to shorten the distance between the Hartmann plate 1 and the area sensor 3, or to enlarge the interval of the openings in the Hartmann plate 1. However, in the former case, for an incident light other than the plans wave, the displacement of the luminous point becomes small, lowering the sensitivity to the displacement. In the latter case, the density of the luminous point becomes small decreasing the measurement point. Thus, the accuracy of the measurement of wavefront shape is deteriorated in both cases.

Especially, when measuring a wavefront greatly distorted from a flat plane, such as a light beam transmitted through a lens, the above-mentioned problems cannot be ignored, and it is absolutely necessary to avoid remarkable blurring of the luminous points so as to improve measurement accuracy.

SUMMARY OF THE INVENTION

With the foregoing in view, it is an object of the present invention to provide a wavefront sensor, which is capable of achieving a measurement with high accuracy by avoiding the creation of remarkably blurred luminous points, regardless of wavefront shape of an incident light beam.

Another object of the present invention is to provide a lens meter and a reflection telescope using the wavefront sensor.

To achieve the foregoing objects, the present invention provides in one aspect a wavefront sensor comprising: a plurality of lenses disposed in the same plane and an area sensor which receives a bundle of rays of light collected through each of the lenses as a luminous point so that the wavefront sensor measures wavefront shape of a light beam incident to the lenses based on the position of the luminous points on the area sensor. Each of the lenses comprises a plurality of concentric areas with different focal lengths, and the area sensor is located substantially halfway between a first position in which a plane wave forms an image after passing through one of the concentric areas with a minimum focal length, and a second position in which the plane wave forms an image after passing through another area with a maximum focal length.

In one preferred form of the invention, the respective focal lengths of the concentric areas change stepwise from a central portion toward a peripheral portion of each of the lenses. As an alternative, the respective focal length of the concentric areas change continuously from the central portion toward the peripheral portion of each of the lenses.

Form the manufacturing point of view, it is preferable that the central portion of each lens has the maximum fill length, and the peripheral portion of each lens has the minimum focal length.

The lenses preferably comprise a diffraction optical element.

In another aspect the present invention provides a lens meter in which the wavefront sensor of the foregoing construction is incorporated.

In still another act the present invention provides an active optical reflection telescope using the wavefront sensor of the foregoing construction.

DETAILED DESCRIPTION OF THE PREFERRED EMBODIMENTS

The following description is merely exemplary in nature and is in no way intended to limit the invention or its application or uses.

Figure 1:
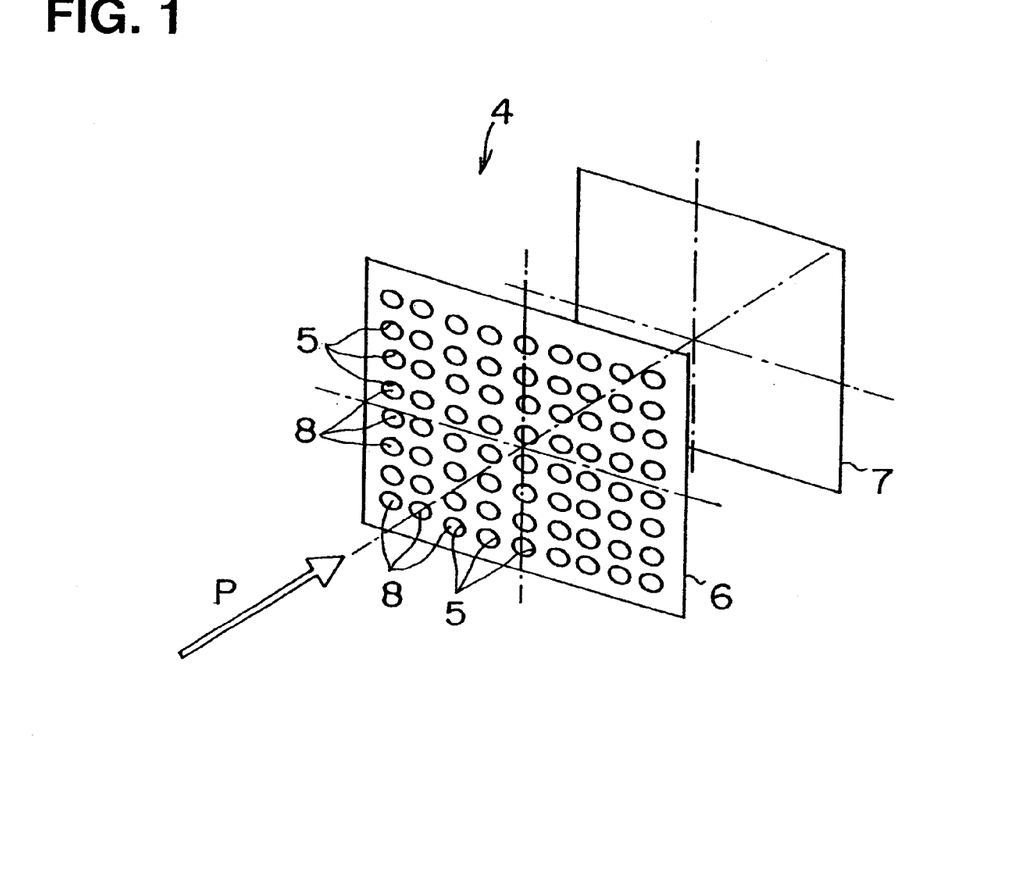
FIG. 1 is a schematic perspective view showing the general construction of a wavefront sensor according to the present invention.

Referring to the drawing and FIG. 1 in particular, there is shown the general construction of a Hartmann wavefront sensor according to an embodiment of the present invention. The wavefront sensor 4 generally comprises a Hartmann plate 6 having a plurality of openings 5 formed regularly therein at a constant interval and an area sensor 7 disposed parallel to the Hartmann plate 6. An incident light beam P falls on or strikes the Hartmann plate 6 from the opposite side of area sensor 7. The incident light beam P forms a thin pencil or bundle of rays of light as it passes through the openings 5 and creates multiple luminous points on the area sensor 7 corresponding in number to the number of the openings 5.

Figure 2:
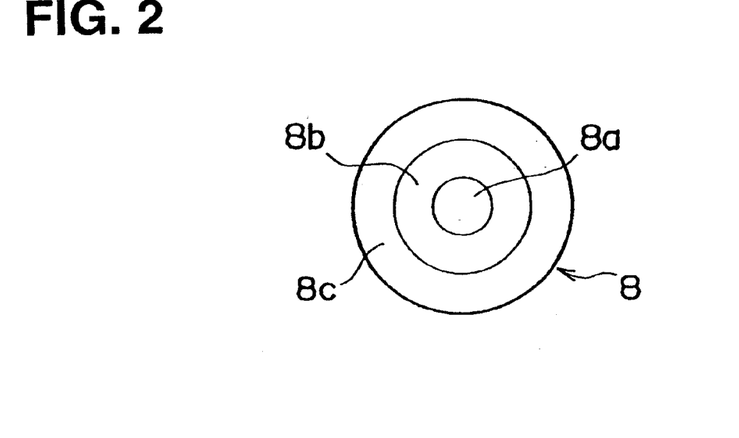
FIG. 2 is a plan view of a lens adapted to he mounted on the wavefront sensor.
Figure 3:
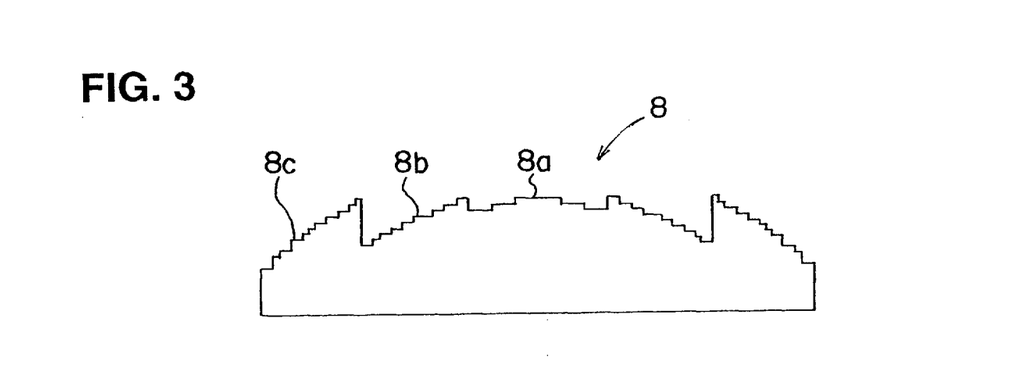
FIG. 3 is an enlarged view showing the cross-sectional profile of a diffraction optical element forming the lens.

Each of the openings 5 of the Hartmann plate 6 is equipped with one lens 8. The lens 8 has a focal length so set as to vary depending on portions thereof In the illustrated embodiment, the lens 8, as shown in FIG. 2, has three concentric annular areas 8a, 8b and 8c with different focal lengths, and the focal lengths become smaller in a gradual or otherwise stepwise fashion in a-direction from a central portion (area 8a) of the lens 8 to a peripheral portion (area 8c). From the manufacturing point of view, it is preferable that the lens 8 comprises a diffraction optical element such as shown in FIG. 3.

The area sensor 7 is located substantially halfway between a first position in which a plane wave forms an image when passing through the area & having the minimum focal length f3, and a second position in which the plane wave forms an image when passing through the area 8a having the a d focal length f1. Assuming that the distance from the Hartmann plate 6 to the area sensor 7 is 14 then, f3<L<f1.

Application of Wavefront Sensor to Lens Meter

Figure 4:
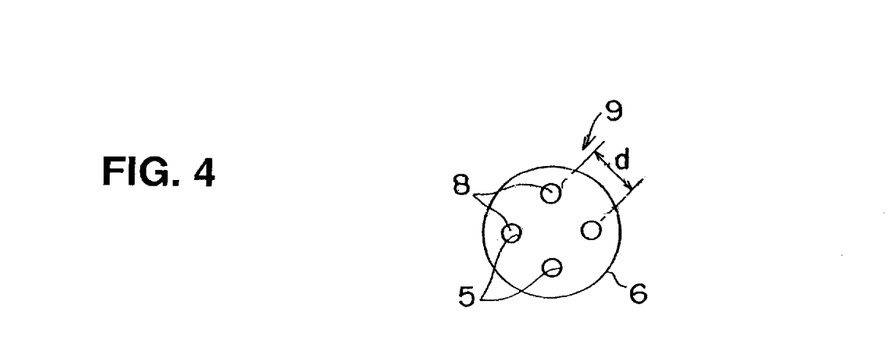
FIG. 4 is a diagrammatic view showing an arrangement used when the wavefront sensor of the present invention is applied to a lens meter.
Figure 5:
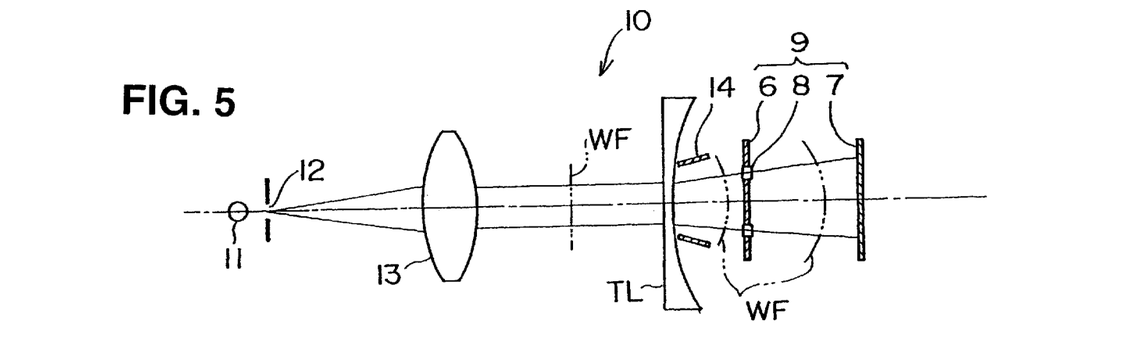
FIG. 5 is a diagrammatic view showing the general construction of a lens meter in which the wavefront sensor of the present invention is incorporated.

FIG. 4 schemata illustrates an arrangement taken when the wavefront sensor 4 of FIG. 1 is to be incorporated in a lens meter. In FIG. 4, these parts of a wavefront sensor 9 which are like or corresponding to those of the wavefront sensor 4 are designated by the same reference characters, and a further description thereof can, therefore, be omitted. FIG. 5 diagrammatically shows the general construction of the lens meter 10 in which the wavefront sensor 9 is incorporated.

In the wavefront sensor 9, the center of a Hartmann plate 6 and the center of an area sensor 7 are aligned with an optical axis of the lens meter 10. The Hartmann plate 6 has four openings 5 formed therein at equal angular intervals (with 90° pitch difference) about the center (optical axis). It is preferable that the number of the openings 5 is four or more as in the illustrated embodiment when considering the measurement accuracy. However, three openings can be enough when lens characteristics to be measured at the spherical focal power, cylindric focal power, cylinder axis angle, or eccentricity.

The lens meter 10 comprises a light source 11, a pinhole 12, a collimator lens 13, a lens holder 14, and the wavefront sensor 9. The pinhole 12 is located at a target focal point of the collimator lens 13. The lens holder 14 is adapted to support thereon a lens TL to be tested (hereinafter referred to as "tested lens"). WF in FIG. 5 denotes a wavefront of the light beam P.

Light emitted from the light source 11 passes through the pinhole 12, which forms a point light sources A light beam from the point light source then passes through the collimator lens 13, which creates a plane wave (collimated light). When a lens TL to be tested is not placed on the lens holder 14, the plane wave directly strikes the lenses 8 and then is received by the area sensor 7. In this instance, the interval of the luminous points created on the area sensor 7 is equal to the interval of the openings 5 in the Hartmann plate 6.

In the case where a lens TL to be test is placed on the lens holder 14, the plane wave incident to the lens TL is converted into a spherical wave according to the characteristics of the lens TL, then passes through the openings 5 in the Hartmann plate 6. When the tested lens TL is a plus lens or a lens having a positive focal power, the interval of the luminous points created on the area sensor 7 becomes smaller than the interval of the openings in the Hartmann plate 6. Conversely, when the tested lens TL is a minus lens or a lens having a negative foal power, the interval of the luminous points on the area sensor 7 becomes greater than the interval of the openings in the Hartmann plate 6. Accordingly, by obtaining the interval of the luminous points on the area sensor 7, the optical characteristics of a lens TL to be tested, which is inserted on the lightpath, can be calculated. For instance, assuming that the distance between the apex on the backside of the tested lens TL and the a plate 6 is ΔL, the interval of the openings 5 in the Hartmann plate 6 is d, and the displacement of luminous points on the area sensor 7 relative to the luminous points formed in the absence of the tested lens TL is Δd, then a back focus of the tested lens TL should be calculated by the equation below:

$$Bf = \Delta L - L \cdot d / \Delta d$$

For comparative purposes, a more specific example of the present invention will be described below in conjunction with a comparative example.

Comparative Example

In the comparative example, the conventional wavefront sensor shown in FIGS. 12(a)–12(c) is used in the lens meter 10 in place of the wavefront sensor 9. The Hartmann plate 1 and area sensor 3 of the conventional wavefront sensor are similar to the Hartmann plate 6 and area sensor 7, respectively, of the wavefront sensor 9 but differ therefrom in that the lenses 2 used in the Hartmann plate 1 comprise a single focus lens.

In the case where the refracting power of the tested lens TL is approximately 0D, because a wavefront similar to the plane wave is incident to the Hartmann plate 1, the pinhole 12 arming a point light source focuses the light on the area sensor 3 and forms a clear or sharp luminous point Q1 (FIG. 12(a)). In this instance, the luminous point Q1 has high luminous energy (as indicated by the solid line shown in FIG. 13) and excels in S/N ratio, the position of luminous point Q1 can be detected with high accuracy. In addition, any scars or contamination on the surface of the tested lens TL does not affect the measurement result significantly.

On the other hand, when the refraction power of the tested lens TL is large or high, the wavefront of light beam P incident to the Hartmann plate 1 forms a spherical wave with a small curvature. When the tested lens TL has a high plus or positive focal power, an image is formed far ahead of the area sensor 3 (FIG. 12(b)), and when the tested lens TL has a high minus or negative focal power, an image is created farther behind the area sensor 3 RIG. 12(c)). Accordingly luminous points Q2 and Q3 formed on the area sensor 3 become significantly blurred. These blurred luminous points Q2 and Q3 have lower peak luminous energy (indicated by the broken line shown in FIG. 13) and low S/N ratio, thereby significantly deteriorating the accuracy of position detection of luminous points Q2 and Q3. In addition, a scar or contamination on the surface of the tested lens TL tends to produce errors in the measurement result.

It is possible to obtain less blurred luminous points by making the openings in Hartmann plate 1 smaller to thereby deepen the depth of focus. This measure is, however, practically undesirable as it decreases the luminous energy on the area sensor 3. It is also possible to move or displace the area sensor 3 according to the focal power of tested lens TL in such a manner as to keep the focal point always located on the area sensor 3. However, this requires an additional area-sensor moving mechanisms causes element of the lens meter as a whole due to the complexity of optical system, incurs an additional cost, and causes elongation of the measurement time.

Inventive Example

In the inventive example, the respective focal lengths f1, f2 and f3 of the concentric areas 8a, 8b and 8c of the wavefront sensor 9 are set such that an can be formed on the area sensor 7 when each of tested lenses TL with focal powers +10D, 0D, and −10D is placed on the lens meter 10. For example, when ΔL=5 mm and L=15 mm, the focal lengths f1, f2, and f3 should be +17.8, +15, and +13.1 mm, respectively.

Figure 6A:
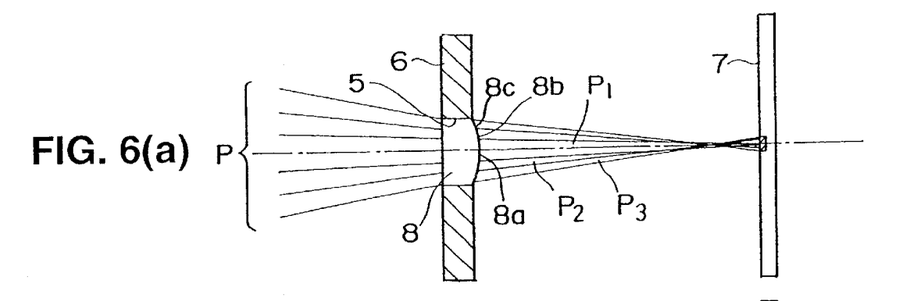
FIG. 6(a) is a view illustrative of the manner in which an image is formed when a convergent light beam is incident on the wavefront sensor.
Figure 7A:
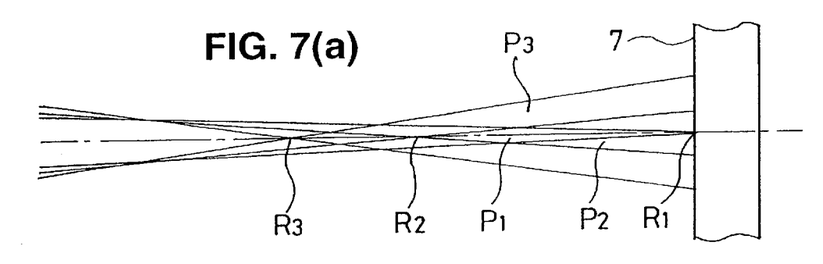
FIG. 7(a) is an enlarged view of a portion of FIG. 6(a) including an area sensor.

When a spherical wave generated by the +10D tested lens TL is incident to the lens 8, light P1 passing though the area 8a forms an image on the area sensor 7, as shown in FIG. 6(a) and FIG. 7(a). At this time, light P2 pad through the area 8b forms an image at a point ahead of the area sensor 7, and light P3 passing through the area 8c forms an image at a point further ahead of the area sensor 7.

Figure 6B:
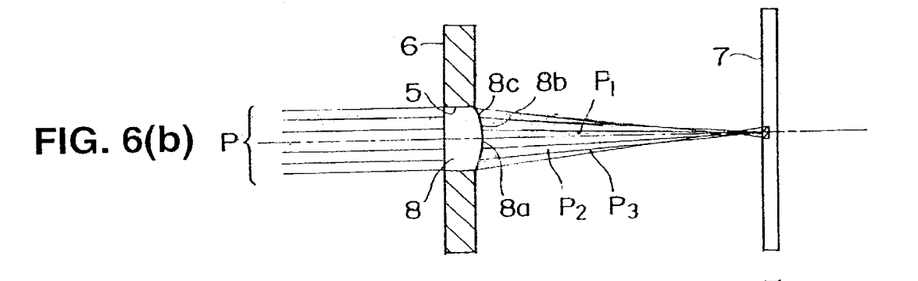
FIG. 6(b) is a view illustrative of the manner in which an image is formed when a parallel light beam is incident on the wavefront sensor.
Figure 7B:
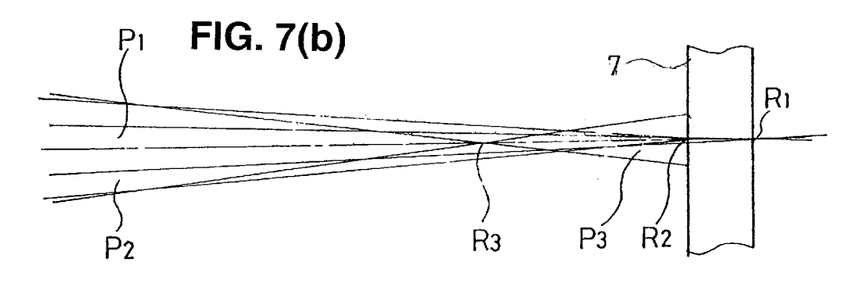
FIG. 7(b) is an en d view of a portion of FIG. 6(b) including the area sensor.

When a plane wave generated by the 0D tested lens TL is incident to the lens 8, light P2 passing though the area 8b forms an image on the area sensor 7, as shown in FIG. 6(b) and FIG. 7(b). In this instance, light P2 passing through the area 8a forms an image behind the area sensor 7 (actually, an image does not created because the area sensor 7 blocks the light), and light P3 passing through the area 8c forms an image ahead of the area sensor 7.

Figure 6C:
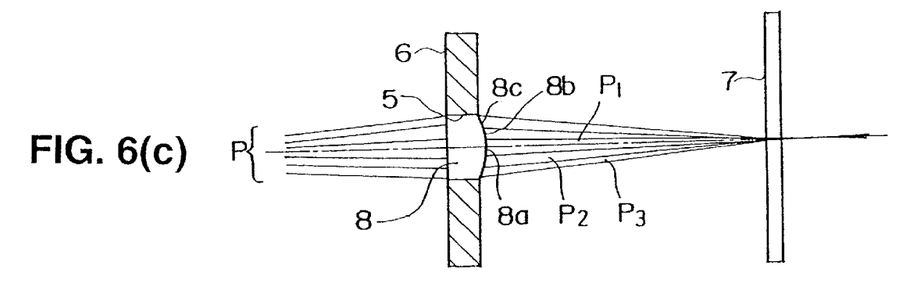
FIG. 6(c) is a view illustrative of the manner in which an image is formed when a divergent light beam is incident on the wavefront sensor.
Figure 7C:
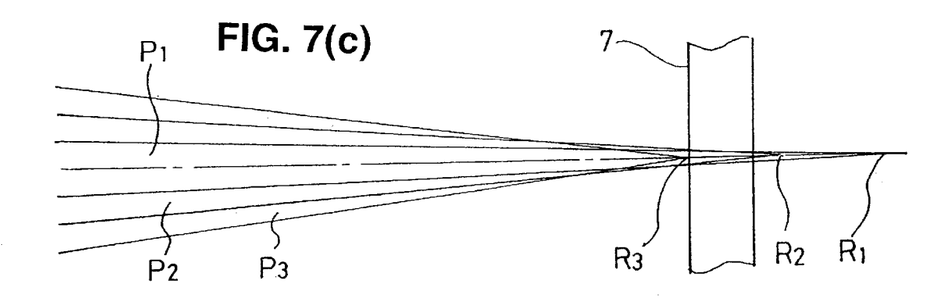
FIG. 7(c) is an enlarged view of a portion of FIG. 6(c) including the area sensor.

When a spherical wave generated by the −10D tested lens TL is incident to the lens 8, light beam P3 passing though the area 8c forms an image on the area sensor 7, as shown in FIG. 6(c) and FIG. 7(c). In this instance, light P2 passing through the area 8b forms an image behind the area sensor 7, and light P1 passing through the area 8a forms an image still farther behind the area sensor 7.

In FIGS. 7(a)–7(c), R1, R2, and R3 denote image-forming points of the lights P1, P2 and P3, respectively.

Figure 8:
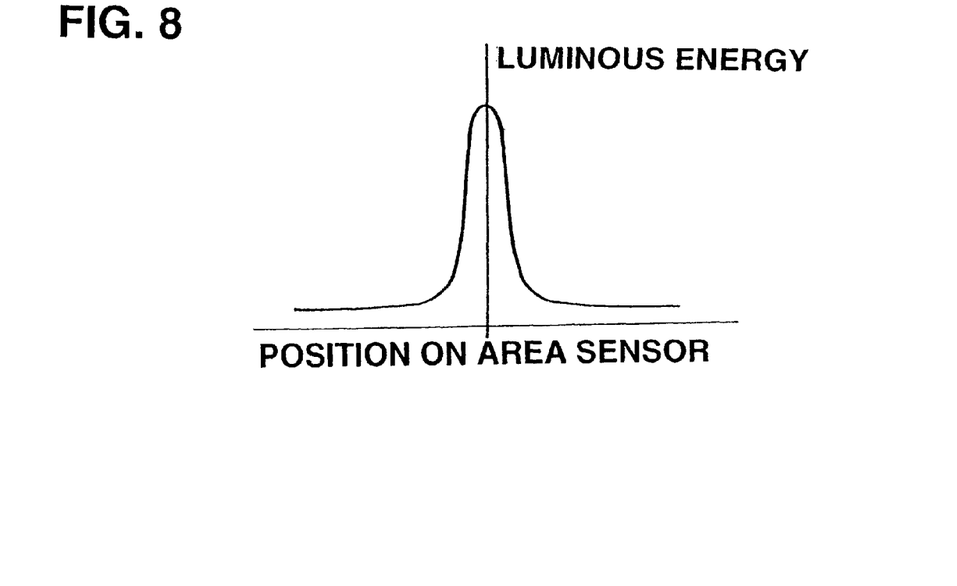
FIG. 8 is a graph showing a luminous energy distribution on the area sensor of the wavefront sensor shown in FIGS. 6(a)–6(c)

In the inventive example, part of the light beam P form an image on or in the vicinity of the area sensor 7 regardless of wavefront shape of the incident light beam P, by passing through any of the areas 8a, 8b and 8c in the lens 8. Thus, the luminous energy distribution such as shown in FIG. 8 can be obtained even when the remainder of light beam P incident to an unmatched area, such as the area 8a or 8b for the plane wave. The luminous energy distribution thus obtained has a low peak value and obtains a blurred luminous point, when compared with the luminous energy distribution (indicated by the solid line shown in FIG. 13) obtained around 0D, which is properly focused. However, this blurred image does not significantly at the accuracy of detection of luminous points by the area sensor 7. On the contrary, when compared with the luminous energy distribution (indicated by the broken line shown in FIG. 13) obtained by the tested lens TL with a higher re acting power, which cannot obtain proper focus, the luminous energy distribution of the inventive example has a higher peak value and obtains a luminous point with a smaller diameter, leading to an improved degree of measurement accuracy.

The wavefront sensor according to the comparative example is difficult to maintain constant measurement accuracy because it creates great differences in luminous energy and diameter depending on wavefront shape of the incident light beam P. However, the wavefront sensor 9 of the inventive example can always maintain constant luminous energy and diameter of the luminous points regardless of wavefront shape of the incident light beam P, thus securing a highly accurate measurement.

Figure 9:
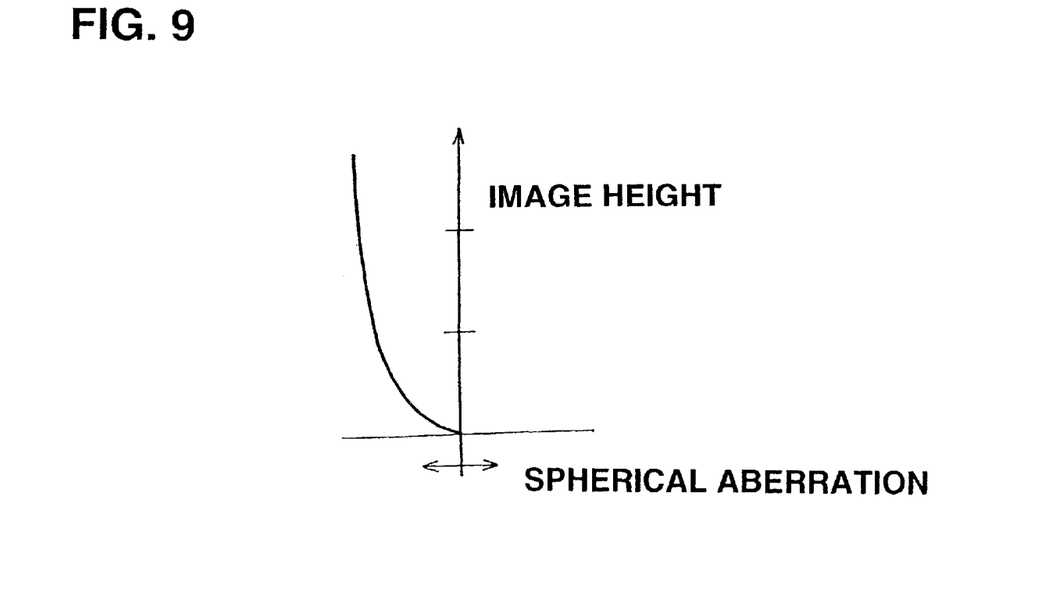
FIG. 9 is a graph showing the manner in whiz the focal length of the lens continuously changes.
Figure 10:
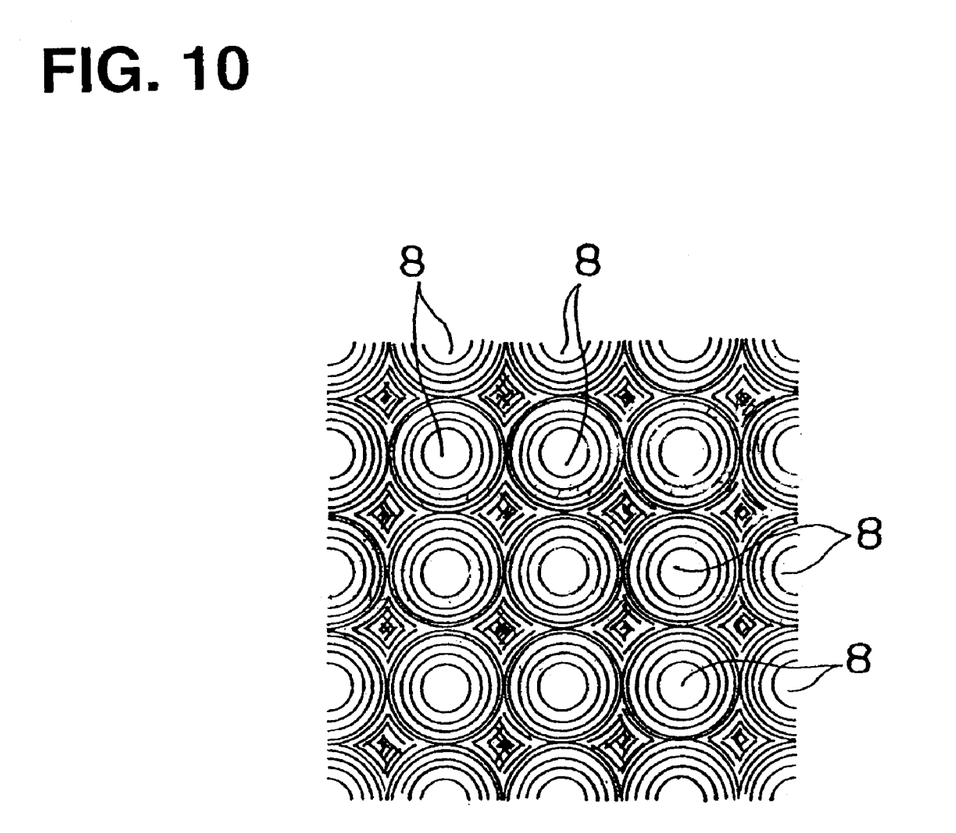
FIG. 10 is a fragmentary plan view of a lens array composed of a plurality of lens formed integrally in the same plane.

Although in the inventive example, the focal lengths f1, f2 and f3 of the lens 8 changes gradually or otherwise stepwise, the lens may have a focal length way continuously in a direction from the central portion of the lens toward the peripheral portion, as indicated by a spherical aberration curve shown in FIG. 9.

For example, assuring that when transmitted light form a +25 tested lens passes through a central portion of the lens 8 including the optical axis, an image is formed on the area sensor 7, and when transmitted light from a −25D tested lens TL passes through an outermost peripheral portion of the lens 8, an image is formed on the area sensor 7, then the focal length of the central portion should be set to 26.3 mm, and that of the outermost peripheral portion to 11.3 mm (spherical aberration of the outermost peripheral portion is −15 mm), and the focal length of an intermediate portion between the central and outermost peripheral portions should be set to vary continuously from 26.3 mm to 11.3 mm.

The focal length of the lens 8 thus becoming smaller either gradually or continuously form the central portion of the lens 8 toward the peripheral portion is for the convenient of manufacture of the lenses. The arrangement should by no means be limited to this, hut may include a lens with a focal length varying gradually from the peripheral portion toward the central portion Further, the focal length way continuously or gradually in the radial direction of the lens is not an essential requirement for the invention.

Because a spherical lenses are difficult to manufacture only by way of grinding, it is desirable to produce the lenses as a diffraction optical element previously described. In addition, the lenses may also be formed integrally as a single by lens array.

Application of the Wavefront Sensor to Reflecting Telescope

Figure 11:
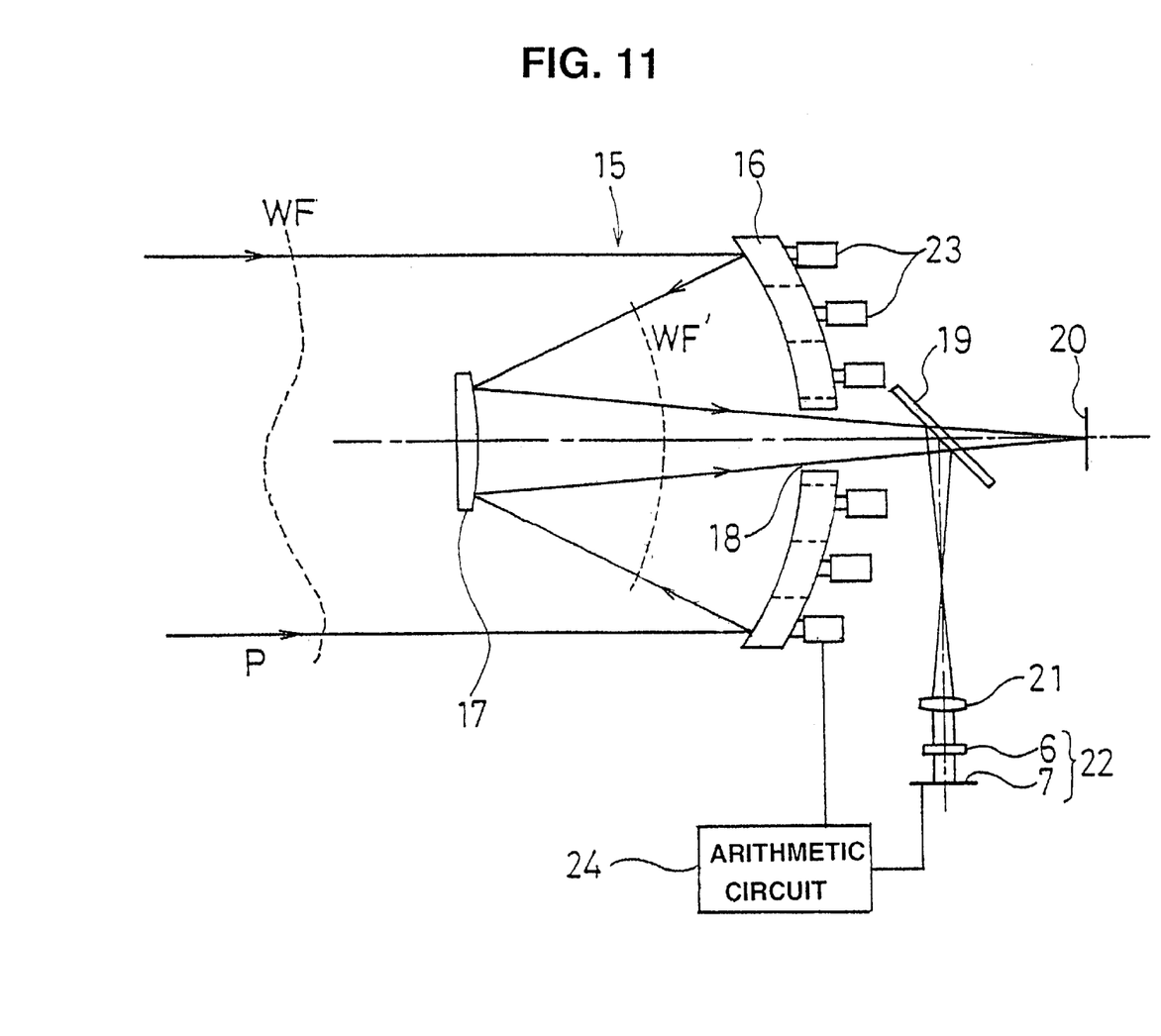
FIG. 11 is a diagrammatical view showing the general construction of an active optical reflecting telescope in which the wavefront sensor of the present invention is incorporated.

FIG. 11 diametrically shows the general construction of an active optical reflecting telescope in which the wavefront sensor of the present invention is incorporated. In the reflecting telescope 15, a light beam P from a distant point is reflected by a concave mirror 16 toward a convex mirror 17. The light beam reflected by the convex mirror 17 passes through an op 18 formed in a central portion of the concave mirror 16, and then passes through a beam splitter 19 to reach an observation plane 20. The beam splitter 19 reflects part of the light beam and, the reflected part of light beam, as it subsequently passes through a collimator lens 21, becomes parallel rays of light. The parallel rays are then introduced into a wavefront sensor 22 comprised of a Hartmann plate 6 equipped with lenses 8 (cf. FIG. 1) and an area sensor 7.

A plurality of actuators 23 is disposed on the back of the concave mirror 16 for deforming the surface of the mirror 16. The actuators 23 are driven to deform the mirror surface so that a distorted wavefront WF is converted into a well formed spherical wavefront WF. In this instance, it is necessary to obtain the amount of distortion of the incident wavefront WF and the amount of deformation of the mirror surface due for the compensation of the wavefront distortion, and to determine the amount of movement of the actuators 23 based on the desired deformation of the mirror surface. The wavefront sensor 22 is used to detect the wavefront distortion. An arithmetic circuit 24 is connected to the wavefront sensor 22 for determining, on the basis of the detected wavefront distortion, a necessary amount of movement of the actuators 23. The actuators 23 are driven based on the movement amount determined by the arithmetic circuit 24.

As described above, since according to the present invention, light passing through any of plural concentric areas of different focal lengths in each lens creates an image on or in the vicinity of an area sensor, the measurement can be always achieved with high accuracy without involving remarkable blurring of luminous points regardless of the shape of wavefront.

Obviously, various minor changes and modifications of the present invention are possible in the light of the above teaching. It is therefore to be understood that within the scope of the appended claims, the present invention may be practiced otherwise than as specifically described.

What is claimed is:

1. A wavefront sensor comprising:
a plurality of lenses disposed in the same plane; and
an area sensor which receives a bundle of rays of light collected through each of said lenses as a luminous point, wherein the wavefront sensor measures wavefront shape of a light beam incident to said lenses based on the position of the luminous points on said area sensor, characterized by each of said lenses; comprises a plurality of concentric areas with different focal length and said area sensor is located substantially halfway between a first position in which a plane wave forms an image after passing through one of said concentric areas with a minimum focal length, and a second position in which the plane wave forms an image after passing through another area with a maximum focal length.

2. The wavefront sensor according to claim 1, wherein the respective focal lengths of said plurality of concentric areas change stepwife from a central portion toward a peripheral portion of each of said lenses.

3. The wavefront sensor according to claim 2, wherein the central portion of each of said lenses has the maximum focal length, and the peripheral portion of each of said lenses has the minimum focal length.

4. The wavefront sensor according to claim 3, wherein said lenses each comprise a diffraction optical element.

5. A lens meter using the wavefront sensor according to claim 4.

6. An active optical reflection telescope using the wavefront sensor according to claim 4.

7. A lens meter using the wavefront sensor according to claim 3.

8. An active optical reflection telescope using the wavefront sensor according to claim 3.

9. The wavefront sensor according to claim 2, wherein said lenses each comprise a diffraction optical element.

10. A lens meter using the wavefront sensor according to claim 9.

11. An active optical reflection telescope using the wavefront sensor according to claim 9.

12. A lens meter using the wavefront sensor according to claim 2.

13. An active optical reflection telescope using the wavefront sensor according to claim 2.

14. The wavefront sensor according to claim 1, wherein the respective focal lengths of said concentric areas change continuously from a central portion toward a peripheral portion of each of said lenses.

15. The wavefront sensor awarding to claim 3, wherein the central portion of each of said lenses has the maximum focal length, and the peripheral portion of each of said lenses has the minimum focal length.

16. The wavefront sensor according to claim 15, wherein said lenses each comprise a diffraction optical element.

17. A lens meter using the wavefront sensor according to claim 16.

18. An active optical reflection telescope using the wavefront sensor according to claim 16.

19. A lens meter using the wavefront sensor according to claim 15.

20. An active optical reflection telescope using the wavefront sensor according to claim 15.

21. The wavefront sensor according to claim 14, wherein said lenses each comprise a diffraction optical element.

22. A lens meter using the wavefront sensor according to claim 21.

23. An active optical reflection telescope using the wavefront sensor according to claim 21.

24. A lens meter using the wavefront sensor according to claim 14.

25. An active optical reflection telescope using the wavefront sensor according to claim 14.

26. The wavefront sensor according to claim 1, wherein said lenses each comprise a diffraction optical element.

27. A lens meter using the wavefront sensor according to claim 26.

28. A active optical reflection telescope using the wavefront sensor according to claim 26.

29. A lens meter using the wavefront sensor according to claim 1.

30. An active optical reflection telescope using the wavefront sensor according to claim 1.

* * * * *